May 16, 1967  J. W. FULTON, JR  3,319,946
ENVIRONMENTAL CONTROL APPARATUS
Filed Jan. 7, 1963  3 Sheets-Sheet 1
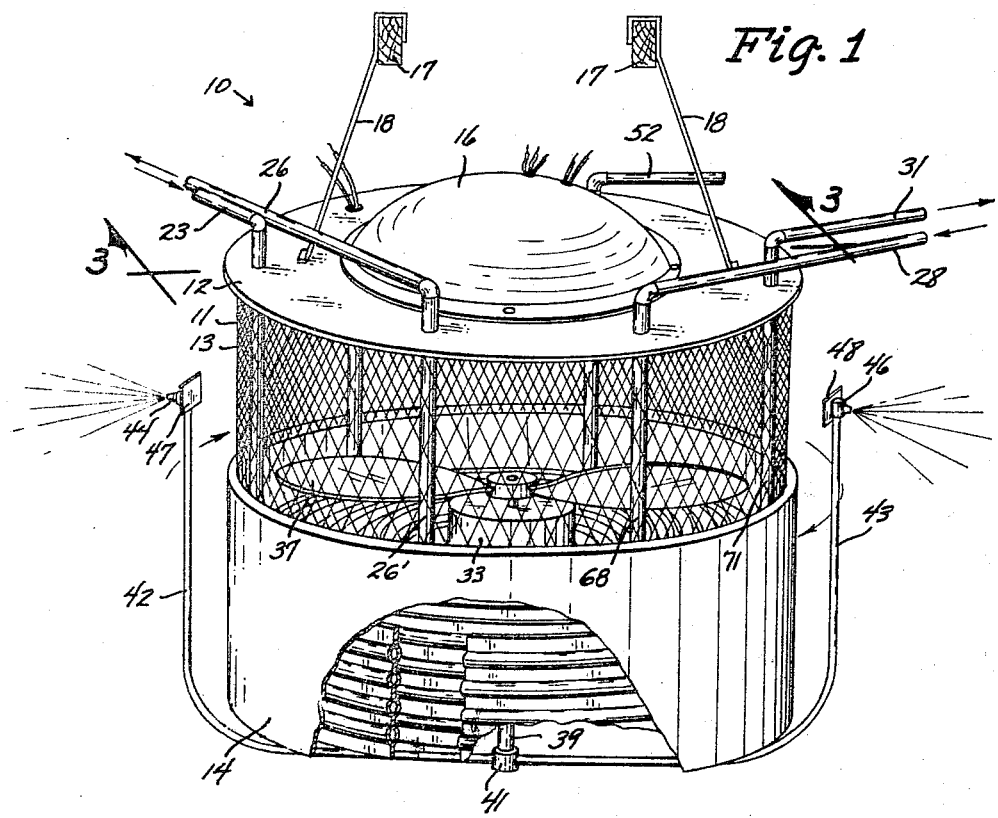
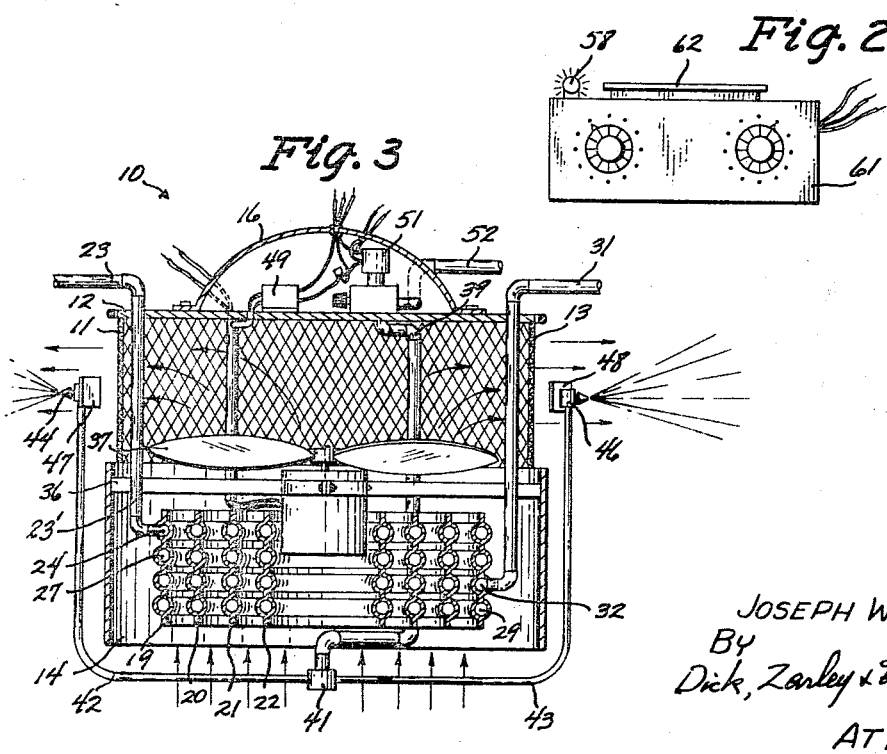
INVENTOR
JOSEPH W. FULTON, JR.
BY
Dick, Zarley & Henderson
ATTORNEYS

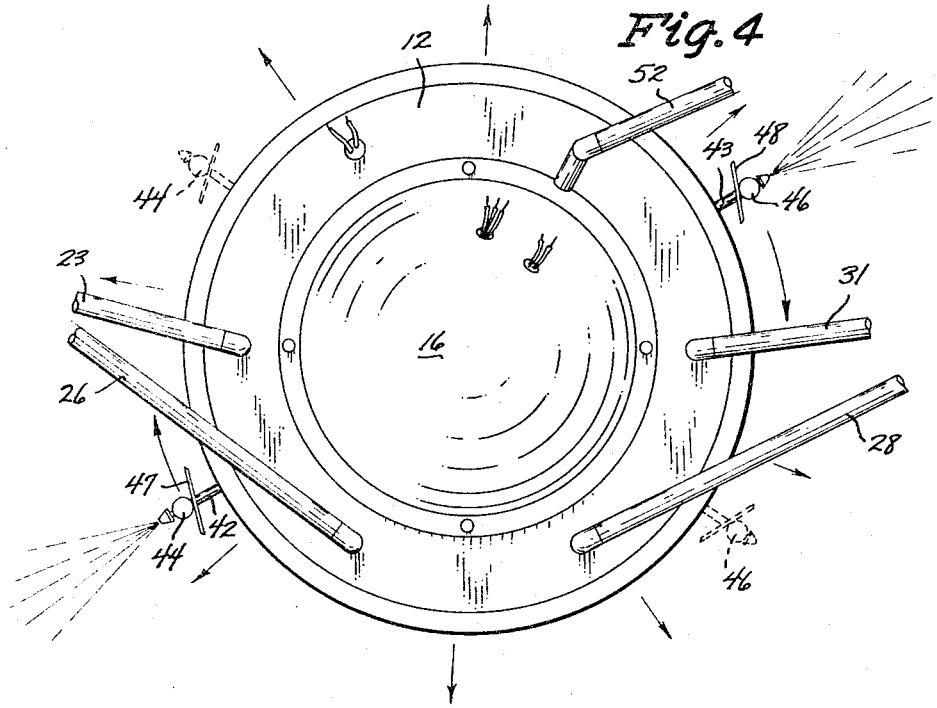
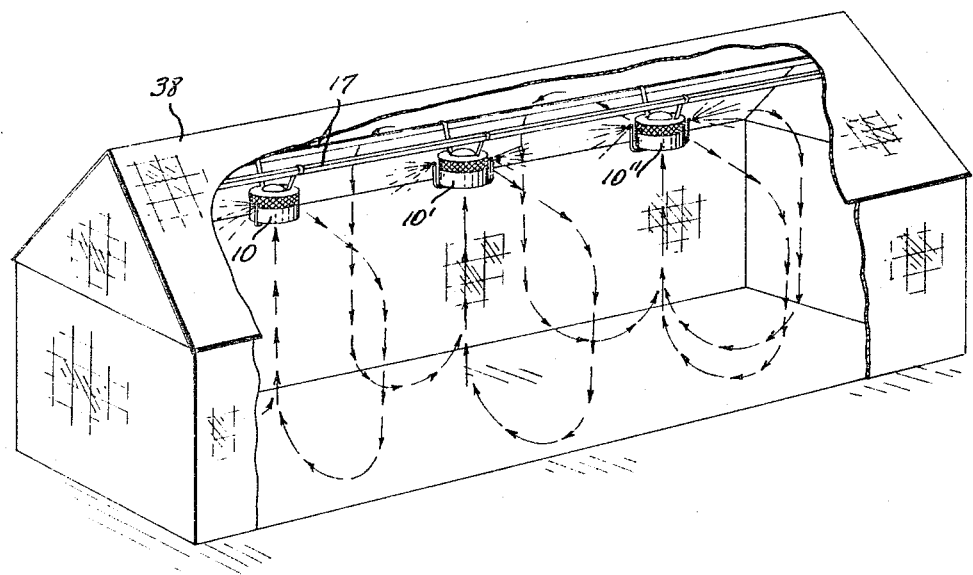

May 16, 1967 J. W. FULTON, JR 3,319,946
ENVIRONMENTAL CONTROL APPARATUS
Filed Jan. 7, 1963 3 Sheets-Sheet 3

INVENTOR
JOSEPH W. FULTON, JR.
BY
Dick, Zarley & Henderson
ATTORNEYS

United States Patent Office 3,319,946
Patented May 16, 1967

3,319,946
ENVIRONMENTAL CONTROL APPARATUS
Joseph W. Fulton, Jr., 1824 Southern Ave.,
Shreveport, La. 71101
Filed Jan. 7, 1963, Ser. No. 249,733
4 Claims. (Cl. 261—129)

This invention relates to an environmental control system, and more particularly to an apparatus utilizing mist for completely conditioning an enclosure.

The problems with present conditions utilizing mist are that the spray nozzles are placed in front of a regular fan blowing the mist in one direction over a small area which results in too wet a floor area and lack of evaporation of the water. In designs that do blow the mist in all directions, too many nozzles are required, or the controls are inefficient.

In the mist heat-air systems, it has been found that gas fumes damage foliage plants, and the use of conventional steam or hot water systems were overly expensive and exhibited a difficulty of control in a large greenhouse, for example. The main disadvantage found was the inefficiency of control over the system wherein the mist is unevenly dispersed, such as when a cloud crosses in front of the sun or the ambient temperature suddenly cools because of a thunder shower, and with a resulting continuance of the mist to flow, thus fog dampening the floor.

It is, therefore, an object of this invention to provide an improved environmental control apparatus for either a heat, mist and air circulation or for a mist and air circulation.

Another object of this invention is to provide an apparatus wherein a mist is dispersed over a three hundred and sixty degree area with a minimum of spray nozzles.

Yet another object of this invention is to provide a mist apparatus wherein the air is kept completely saturated with mist without any accumulation thereof on surfaces within the enclosure.

Still another object of this invention is to provide a mist-type conditioning apparatus wherein water supplied thereto is controlled by a mist-responsive control device.

A further object of this invention is to provide a plurality of interconnected apparatuses utilizing the same heat source in both the supply and return of heated fluid, and also using the same mist-responsive type control for the supply of water to the apparatus.

It is another object of this invention to provide an apparatus capable of attaining the objectives set forth hereinbefore which is economical, easily serviced, and efficient.

These objects and other features and advantages of this invention will become readily apparent from the following description and the accompanying drawings, wherein:

FIG. 1 is a perspective view of one environmental control apparatus of this invention, shown suspended from rafters, and with certain parts broken away for clarity of illustration;

FIG. 2 is a view of one control device for the apparatus;

FIG. 3 is a reduced sectional view taken along the line 3—3 of FIG. 1;

FIG. 4 is a top plan view of the apparatus;

FIG. 5 is a perspective view of a greenhouse and showing three of the apparatuses supported therein;

Figure 6:
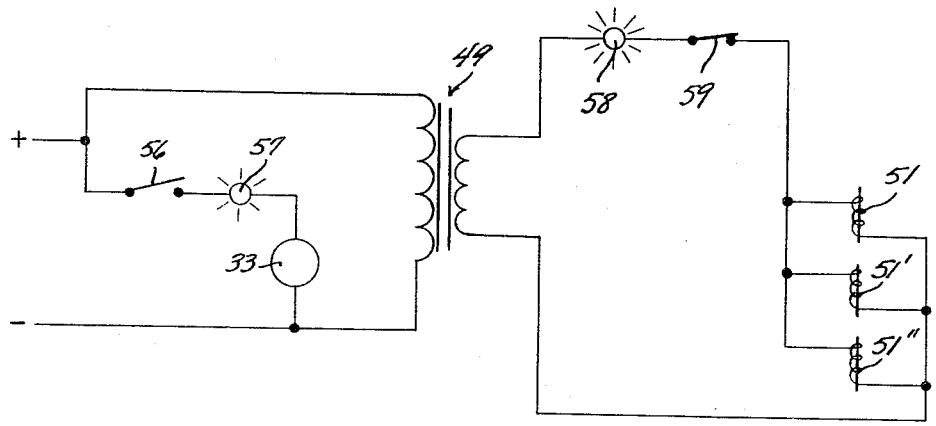
FIG. 6 is a schematic of the electrical system for the three apparatuses.

Referring now to the drawings, one environmental control apparatus is indicated generally at 10 in FIG. 1. The apparatus 10 comprises a circular housing 11 including a top plate 12, a circular grill 13 affixed thereto, and a circular base 14 connected to the grill 13 and open at the bottom. A disked cover 16 is mounted on top of the plate 12 to cover certain control devices, and the plate 12 is suspended from a pair of rafters on stringers 17 by a pair of hangers 18.

Figure 7:
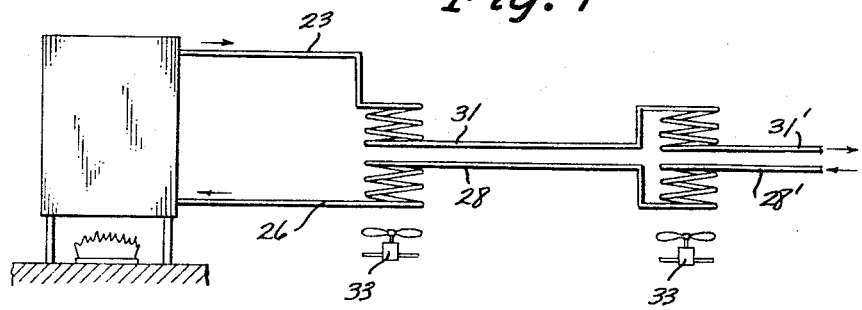
FIG. 7 is a schematic of the heating system therefor.

Within the base 14, a plurality of circular, heating plates 19, 20, 21 and 22 are mounted in a concentric manner. Each plate is of a heat conductive material and has a plurality, four are shown, of annular parallel passages, fluid separated from each other. Shown only herein are connections to the outer plate 19, wherein conduit 23 (FIGS. 1, 3 and 7) leads from a source of heated fluid and supplies said fluid to the upper passage 24.

Conduit 26 (FIGS. 1 and 7) is connected to passage 27 for transmitting fluid back to the source (see arrow in FIG. 1); conduit 28 (FIGS. 1 and 7) is connected with the passage 29 for receiving fluid from another apparatus 10′ (FIG. 5); and conduit 31 supplies fluid for the passage 32 to the other apparatus 10′. Each conduit 23, 26, 28 and 31 includes a vertically disposed straight portion 23′, 26′, 68 and 71 (FIGS. 1 and 3) which in addition to serving as a conduit for heating fluid, serves as a structural part of the apparatus.

Centered within the inner circular heating plate 22 is a motor 33 supported to the base 14 by a support 36 and operable electrically to rotate a fan 37 mounted thereon. The fan 37 upon rotation, pulls air upwardly through the housing base 14, as indicated by the arrows in FIG. 3, and forces it outwardly through the grill 13, due to the closed top plate 12. Thus, the air is forced past the heating elements or coils 19–22, then diffused outwardly of the housing 11 and into an enclosure, such as a greenhouse 38 (FIG. 5).

To provide a mist within the greenhouse 38, water is supplied in a controlled quantity through a pipe 39 (FIGS. 1, 3 and 8) extended downwardly through the housing 11 to a revolving fluid transmitting fixture 41 (FIG. 3) centered beneath the base 14. From the fixture 41, a pair of tubes 42 and 43 extend outwardly and upwardly as best illustrated in FIG. 3, and are provided at their upper ends each with a spray nozzle 44 and 46.

The nozzles 44 and 46 are adapted to spray water horizontally outwardly and away from the housing 11 in the same direction of the air being diffused outwardly therefrom. A relatively flat vane 47 and 48 is positioned on each nozzle 44 and 46 in such a manner (see FIGS. 1 and 3) that movement of the diffusing air thereagainst effects a rotation of the nozzle and tubes as a unit about the revolving fixture 41. Thus, upon operation of the fan 37 and as a result of such operation, the spray nozzles 44 and 46 are rotated continually through a three hundred and sixty degree arc about the housing 11, dispensing a fine spray of water into the air, thus effecting a mist about the apparatus 10.

Figure 8:
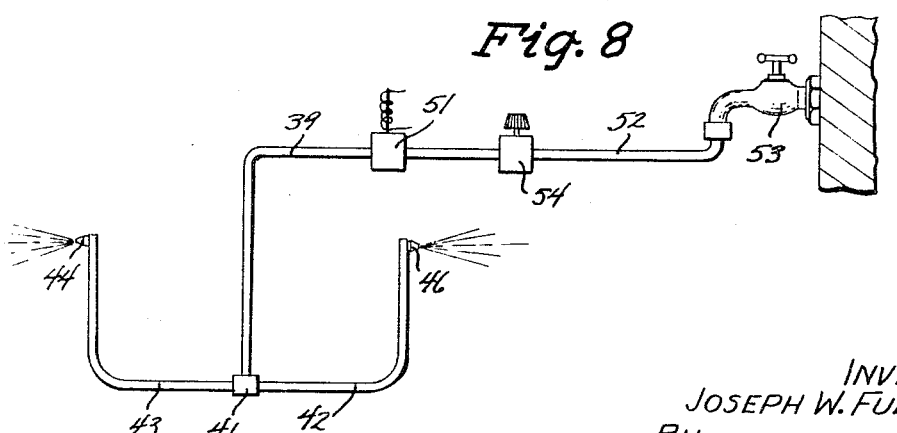
FIG. 8 is a schematic of the water supply system for one of the apparatuses.

Within the dished cover 16 (FIG. 3) are found a transformer 49 for changing a 110 volt A.C. supply to 12 volts for operating a solenoid 51 interposed between the water pipe 39 and a supply pipe 52 leading to the apparatus 10 from a source of water 53 (FIG. 8). A hand operated adjustment valve 54 (FIG. 8) for setting the rate of supply prior to installation of the apparatus may be provided for the pipe 39. Various electric leads detailed hereinafter are also found within the cover 16.

In assembly, the apparatus 10 is placed in series, so to speak, with the apparatus 10′ and a third apparatus 10″, all suspended within the greenhouse 38. The three water control solenoids 51, 51′ and 51″ (FIG. 6) are also placed in series within the water supply electric control circuit. The conduit 31 becomes the supply conduit for a heating plate within the apparatus 10′, and the conduit 31' becomes a supply conduit for a heating plate within the apparatus 10''.

Within the apparatus 10'', although not shown, the supply conduit connects with the return conduit, which connects through a plate in the apparatus 10' with the return conduit 28' which again connects through a plate in the apparatus 10 with the return conduit 28. By this arrangement, the heat from the fluid in the supply passages of a plate is conducted through the heat conductive plate to the fluid in the return passages thereof, and vice versa.

To control the air and water supply systems referring now to FIG. 6, a master on-off switch 56 is provided for the fan motor 33, and an electric eye switch 57 is also provided therefor. Thus, to energize the fan motor independently of the spray and heater system, the master switch 56 need be closed and the electric eye activated.

To activate the solenoids 51, 51' and 51'', another electric eye switch 58 (FIG. 6) is provided in that circuit and an on-off switch 59. The latter switch is normally closed and is part of a control device 61 (FIG. 2) which is an electronic device or an amplifier which senses the mist on a sensing plate 62. When the mist stops evaporating when it hits the plate 62 and remains on the plate 62, it effects an opening of the switch 59. This results in activating the solenoids 51, 51' and 51'' to shut off the water supply to each pipe 39 (FIG. 8).

In summation, this invention describes and discloses a system for providing a pre-controlled heat, mist and air circulation within an enclosure, or wherein only a mist and air circulation system is provided, with automatic controls for ensuring complete and continuous saturation of the air with mist.

Some changes may be made in the construction and arrangement of my environmental control apparatus without departing from the real spirit and purpose of my invention, and it is my intention to cover by my claims, any modified forms of structure or use of mechanical equivalents which may be reasonably included within their scope.

I claim:
1. Apparatus for controlling the environment of an enclosure comprising in combination;
   a first unit including a fan positioned to circulate air within the enclosure, spray means for injecting a fine spray of water into the enclosure, an upper coil fluidly connected at one end to a source of heated fluid, and a lower coil also fluidly connected at one end to said source of heated fluid; and
   a second unit including a fan positioned to circulate air within the enclosure, spray means for injecting a fine spray of water into the enclosure, an upper coil fluidly connected at one end to the other end of said first unit upper coil, and a lower coil fluidly connected at one end to the other end of said first unit lower coil and having another end fluidly connected to the other end of said second unit upper coil.
2. Apparatus for controlling the environment of an enclosure comprising in combination:
   a circular housing adapted to be suspended from the ceiling of the enclosure, said housing having a closed top and an open bottom;
   a fan mounted within said housing and rotatable to pull air upwardly through said bottom and to force it against said closed top;
   said housing having an annular side opening through which said air is diffused outwardly of said housing and into said enclosure;
   a plurality of fluid transmitting, arcuately spaced conduits rotatably mounted as a unit in said housing, and having a spray nozzle connected at each end of said conduits external of said housing; and
   a plurality of vanes mounted on said conduits and in the path of said diffused air whereby said conduits and nozzles rotate about said housing.
3. The apparatus characterized in claim 2, and further wherein a remotely supplied fluid heating element is mounted within said housing and in the path of said air being pulled and forced therethrough.
4. The apparatus characterized in claim 3, and further wherein a mist-responsive means is mounted within the enclosure, said mist-responsive means operable to control the supply of fluid to said conduits in response to contact with a predetermined amount of mist.

References Cited by the Examiner

UNITED STATES PATENTS

| | | |
|---|---|---|
| 957,976 | 5/1910 | Lucas. |
| 1,248,631 | 12/1917 | Dickerson _____ 261—30 |
| 2,029,891 | 2/1936 | Newman _____ 165—170 X |
| 2,047,767 | 7/1936 | Byrd _____ 261—91 X |
| 2,142,423 | 1/1939 | Timmis _____ 261—129 X |
| 2,411,343 | 11/1946 | Singer _____ 261—88 X |
| 2,554,868 | 5/1951 | Mills _____ 261—91 X |
| 3,219,796 | 11/1965 | Graf et al. |

FOREIGN PATENTS 22,007   3/1936   Australia.

HARRY B. THORNTON, *Primary Examiner.*

RONALD R. WEAVER, *Examiner.*